United States Patent [19]

Ueda et al.

[11] Patent Number: 4,739,392
[45] Date of Patent: Apr. 19, 1988

[54] WHITE BALANCE ADJUSTING APPARATUS HAVING A PLURALITY OF STANDARD COLOR REFERENCES AUTOMATICALLY SELECTED BY THE DETECTED COLOR TEMPERATURE

[75] Inventors: Kazuhiko Ueda; Shozo Yukoyama, both of Yokohama, Japan

[73] Assignee: Victor Company of Japan, Ltd., Japan

[21] Appl. No.: 118

[22] Filed: Jan. 2, 1987

[30] Foreign Application Priority Data

Jan. 7, 1986 [JP] Japan .................................. 61-846
Feb. 20, 1986 [JP] Japan ................................ 61-36080

[51] Int. Cl.⁴ .............................................. H04N 9/73
[52] U.S. Cl. .................................................. 358/29
[58] Field of Search ........................................... 358/29

[56] References Cited

U.S. PATENT DOCUMENTS

| | | | |
|---|---|---|---|
| 4,584,598 | 4/1986 | Kutaragi | 358/29 C |
| 4,616,253 | 10/1986 | Hashimoto et al. | 358/29 C |
| 4,682,210 | 7/1987 | Ikemura et al. | 358/29 C |

FOREIGN PATENT DOCUMENTS

| | | | |
|---|---|---|---|
| 25244 | 2/1980 | Japan | 358/29 C |
| 26976 | 2/1982 | Japan | 358/29 C |
| 186188 | 9/1985 | Japan | 358/29 C |

Primary Examiner—John W. Shepperd
Attorney, Agent, or Firm—Andrus, Sceales, Starke & Sawall

[57] ABSTRACT

A white balance adjusting apparatus has a plurality of sensors for producing color temperature detection signals dependent on a color temperature of an environment. An illuminance discriminating circuit produces an illumination discrimination signal indicating whether or not an illuminance of the environment is within a predetermined range. A color temperature discriminating circuit produces a predetermined color temperature detection signal from the color temperature detection signals. A standard color temperature setting circuit sets and outputs one of a plurality of standard color temperature signals for each of a plurality of color temperature regions. A white balance correction control circuit is controlled in dependence on the illumination discriminating signal, the predetermined color temperature detection signals, and the standard color temperature signals so as not to carry out an erroneous white balance adjustment even when the illuminance of the environment is extremely high or low.

16 Claims, 5 Drawing Sheets

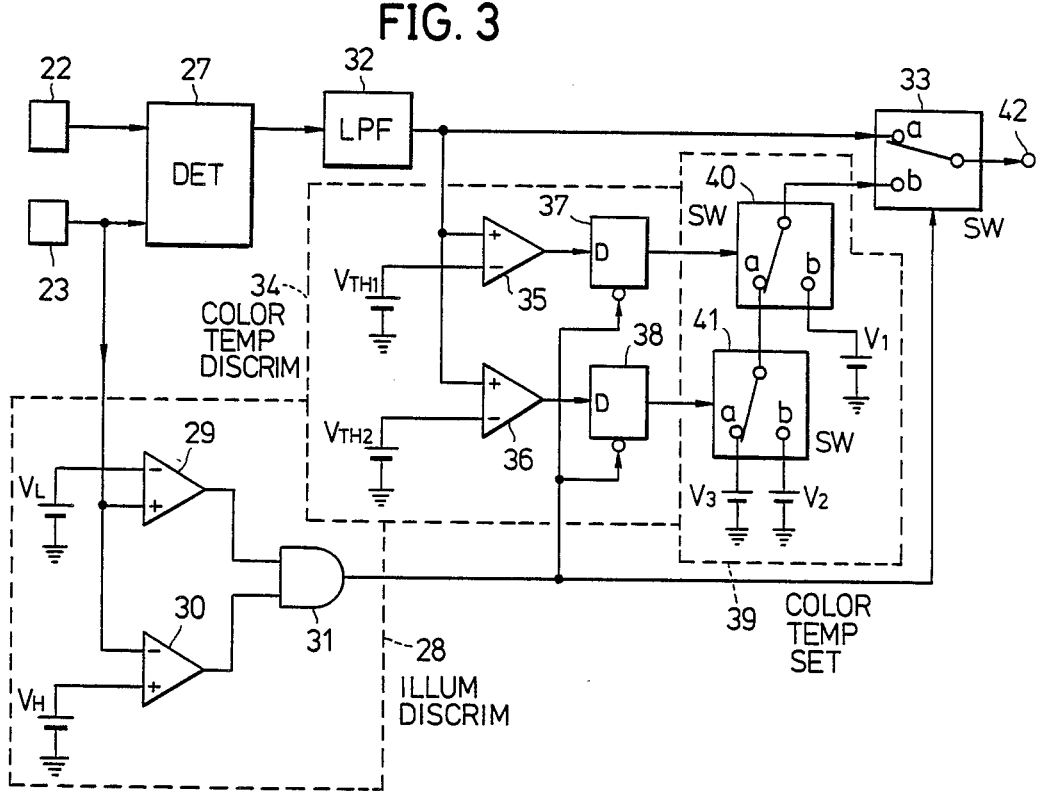
FIG. 3
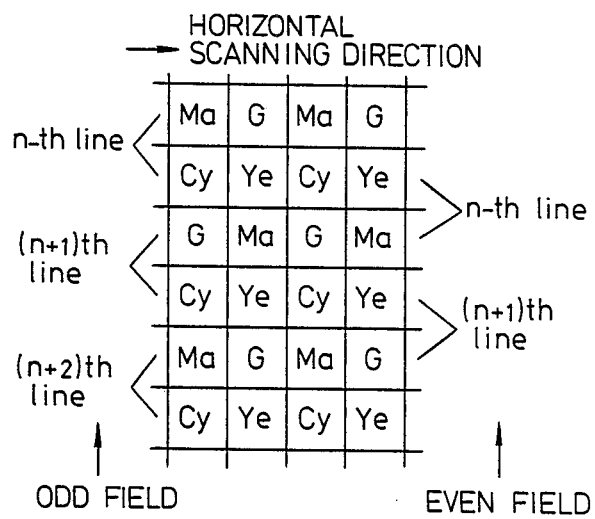
FIG. 5
FIG. 6

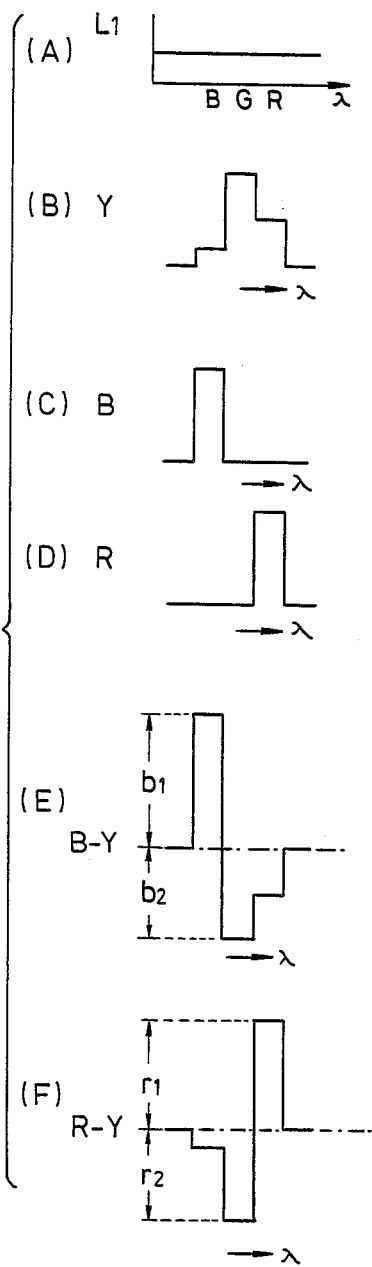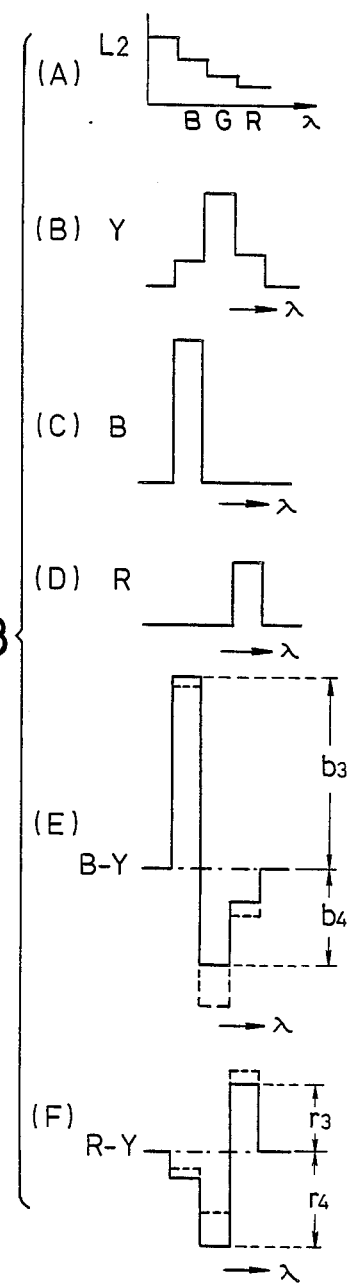

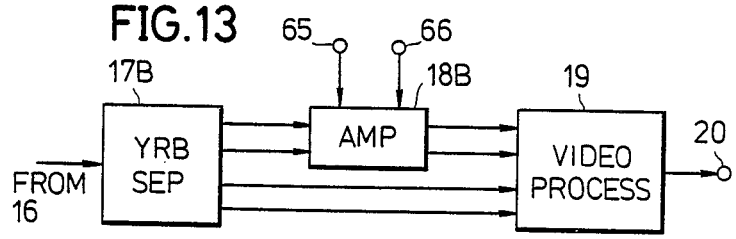
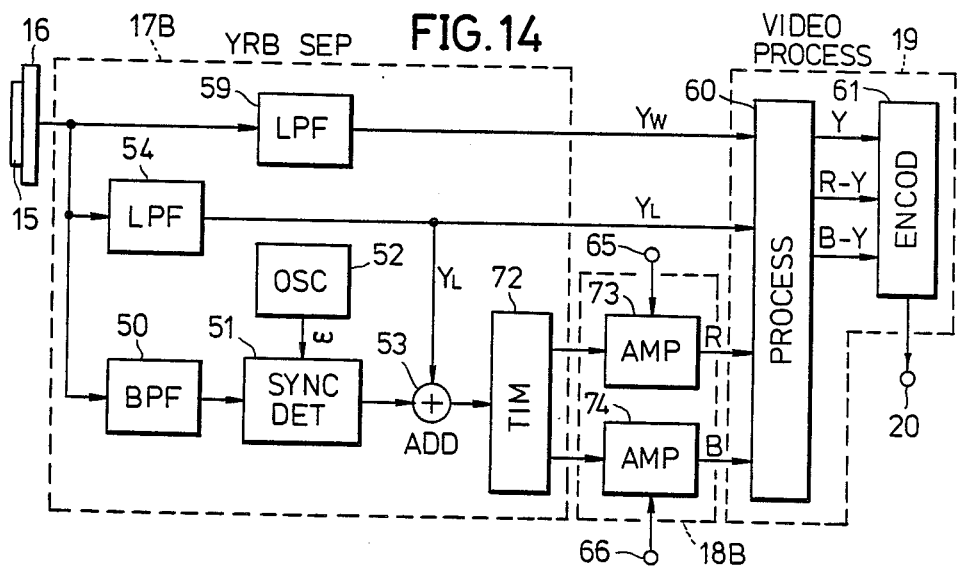
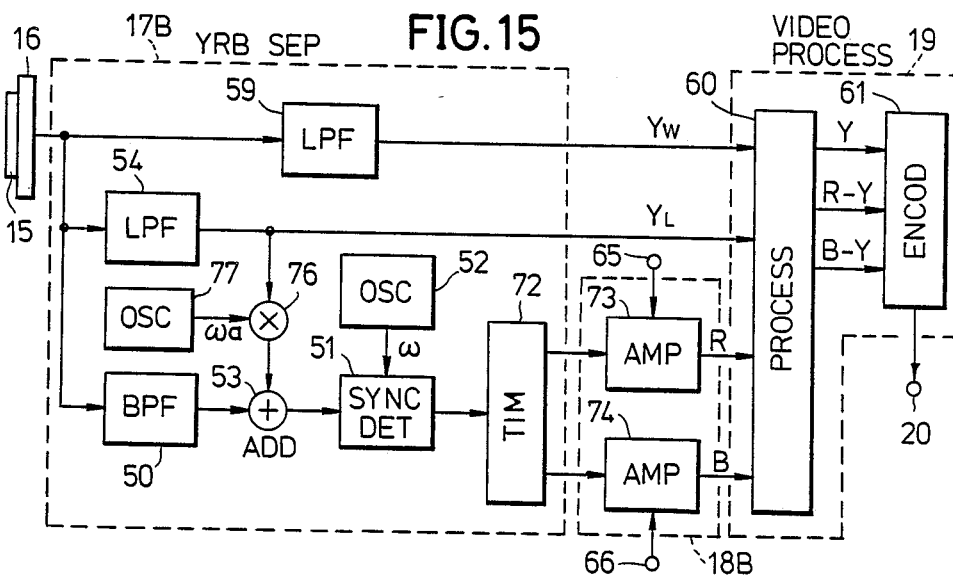

WHITE BALANCE ADJUSTING APPARATUS HAVING A PLURALITY OF STANDARD COLOR REFERENCES AUTOMATICALLY SELECTED BY THE DETECTED COLOR TEMPERATURE

BACKGROUND OF THE INVENTION

The present invention generally relates to white balance adjusting apparatuses, and more particularly to a white balance adjusting apparatus in which a white balance correction control circuit is controlled depending on a color temperature detected by color temperature sensors so as not to carry out an erroneous white balance adjustment even when the illuminance is extremely high or low.

In a video camera using a conventional white balance adjusting apparatus, light from an object which is to be picked up reaches an image pickup device via an optical system. A signal which is obtained in the image pickup device by a photoelectric conversion is supplied to a YRB separating circuit wherein the signal is subjected to signal processings such as amplification, color demodulation and gamma correction. As a result, a luminance signal Y and red and blue primary color signals R and B are produced from the YRB separating circuit, and the primary color signals R and B are respectively supplied to first and second amplifiers.

On the other hand, a sensor part is provided in a vicinity of the optical system on a front of the video camera. A diffusion plate is arranged in front of the sensor part, and a pair of color temperature sensors receive light from the object and the surroundings which is integrated by the diffusion plate. The color temperature sensors have mutually different spectral characteristics and have a high sensitivity with respect to red and blue, respectively. Output signals of the color temperature sensors are supplied to a color temperature detecting circuit which supplies to a white balance correction control circuit a color temperature detection signal having a level dependent on the detected color temperature. The white balance correction control circuit supplies to the first and second amplifiers control signals having levels dependent on the color temperature detection signal, that is, control signals having levels which correspond 1:1 to the detected color temperature. The gains of the first and second amplifiers are controlled responsive to the control signals so that the gain of the primary color signal B is made large and the gain of the primary color signal R is made small when the color temperature is low, for example.

The primary color signals R and B from the first and second amplifiers and the luminance signal Y from the YRB separating circuit are supplied to a video signal processing circuit which produces a standard system color video signal from these signals. Accordingly, the white balance is adjusted by controlling the gains of the first and second amplifiers by the control signals.

Photodiodes which produce signals having levels approximately proportional to the illuminance are generally used for the color temperature sensors. In addition, the color temperature detecting circuit generally comprises first and second logarithmic amplifiers and a differential amplifier, and the output color temperature detection signal of the color temperature detecting circuit has a level $\log(La/Lb)$ when the output signals levels of the color temperature sensors are denoted by La and Lb.

However, the color temperature sensors become saturated when the illuminance is extremely high, and the logarithmic relation cannot be maintained between the input and output signal levels at each of the first and second logarithmic amplifiers when the illuminance is extremely low and the output signal levels La and Lb of the color temperature sensors are extremely small. For this reason, there is a problem in that an erroneous white balance adjustment is carried out when the illuminance is extremely high or low.

SUMMARY OF THE INVENTION

Accordingly, it is a general object of the present invention to provide a novel and useful white balance adjusting apparatus in which the problems described heretofore are eliminated.

Another and more specific object of the present invention is to provide a white balance adjusting apparatus comprising a plurality of sensors having mutually different spectral characteristics for producing detection signals dependent on a color temperature, color temperature detecting means having an illuminance discrimination circuit for producing an illuminance discrimination signal by discriminating from the output detection signal of at least one of the sensors whether or not an illuminance of an environment is within a predetermined range appropriate for a white balance adjustment, a color temperature discriminating circuit for producing a predetermined color temperature detection signal from the output detection signals of the sensors, producing a color temperature discrimination signal by discriminating a color temperature region in which the color temperature of the environment falls and producing a color temperature discrimination signal responsive to the illuminance discrimination signal at a time immediately before the illuminance of the environment falls outside the predetermined range, a standard color temperature setting circuit for setting and producing out of a plurality of standard color temperature signals in respective color temperature regions a standard color temperature signal having a level dependent on the color temperature discrimination signal from the color temperature discriminating circuit, and a switching circuit responsive to the illuminance discrimination signal for selectively passing as an output signal of the color temperature detecting means the predetermined color temperature detection signal when the illuminance of the environment is within the predetermined range and for selectively passing the standard color temperature signal when the illuminance of the environment is outside the predetermined range, white balance correction control means responsive to the output signal of the color temperature detecting means for producing first and second control signals, an image pickup device for picking up an image of an object and for producing a video signal comprising a luminance signal in a baseband and modulated signals obtained by modulating carriers by color difference signals, YRB separating means for separating the luminance signal and first and second primary color signals from the video signal, variable gain amplifier means responsive to the first and second control signals for amplifying the first and second primary color signals, and video signal processing means for producing a standard system color video signal from the first and second primary color signals obtained from the variable gain amplifier means and the luminance signal obtained from the YRB separating means. The first and second control signals control the gains of the variable gain amplifier means so that the levels of the first and second primary color signals and the level of a low frequency component of the luminance signal are approximately the same when an image of a white object is picked up. According to the white balance adjusting apparatus of the present invention, no erroneous white balance adjustment will be carried out even when the illuminance of the environment is extremely high or low, and it is possible to carry out an optimum white balance adjustment so that the color reproducibility (or color reproduction) does not change depending on the color temperature of the illumination source.

Other objects and further features of the present invention will be apparent from the following detailed description when read in conjunction with the accompanying drawings.

BRIEF DESCRIPTION OF THE DRAWINGS

FIG. 3 is a system circuit diagram showing an embodiment of a color temperature detecting circuit in the block system shown in FIG. 2;

FIG. 5 is a block diagram showing an embodiment of a white balance correction control circuit in the block system shown in FIG. 2;

FIG. 6 shows an example of the construction of a color separation filter in the block system shown in FIG. 2;

FIGS. 7(A) through 7(F), FIGS. 8(A) through 8(F) and FIG. 9 are diagrams for explaining the problems of the conventional white balance adjusting apparatus;

FIG. 13 is a system block diagram showing an essential part of a third embodiment of the white balance adjusting apparatus according to the present invention; and FIGS. 14 and 15 are system block diagrams respectively showing first and second embodiments of a YRB separating circuit system in the block system shown in FIG. 13.

DETAILED DESCRIPTION

Figure 1:
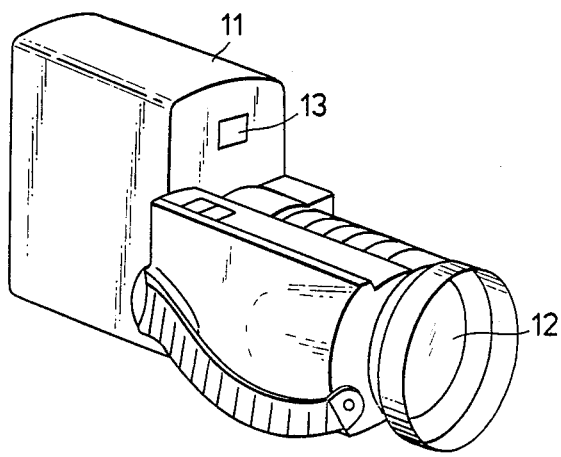
FIG. 1 shows an example of a video camera which may be applied with the white balance adjusting apparatus according to the present invention.

FIG. 1 shows an example of a video camera which may be applied with the white balance adjusting apparatus according to the present invention. The video camera generally comprises a main camera body 11, an optical system 12 and a sensor part 13 which is provided in a vicinity of the optical system 12 at a front of the main camera body 11.

Figure 2:
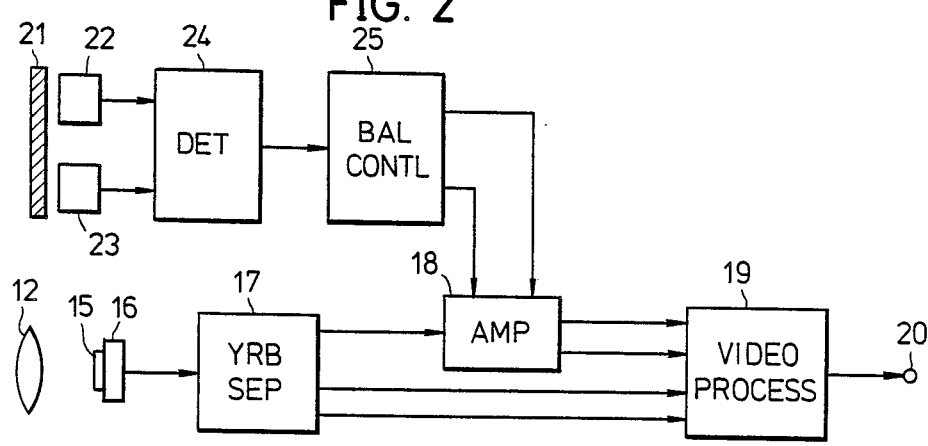
FIG. 2 is a system block diagram showing a first embodiment of the white balance adjusting apparatus according to the present invention.

FIG. 2 shows a first embodiment of the white balance adjusting apparatus according to the present invention.

In the video camera shown in FIG. 1, light from an object which is to be picked up reaches an image pickup device 16 via an optical system 12 and a color separation filter 15. A signal which is obtained in the image pickup device 16 by a photoelectric conversion is supplied to a YRB separating circuit 17 wherein the signal is subjected to signal processings such as amplification, color demodulation and gamma correction. As a result, a wideband component $Y_W$ and a low frequency component $Y_L$ of a luminance signal Y and a line-sequential primary color signal comprising red and blue primary color signals R and B are produced from the YRB separating circuit 17. The components $Y_W$ and $Y_L$ of the luminance signal Y are supplied directly to a video signal processing circuit 19, and the line-sequential primary color signal is supplied to the video signal processing circuit 19 via variable gain amplifier means 18. The signals supplied to the video signal processing circuit 19 are subjected to predetermined signal processings and are formed into a standard system color video signal which is outputted via an output terminal 20.

On the other hand, a diffusion plate 21 is arranged in front of the sensor part 13, and a pair of color temperature sensors 22 and 23 receive the light from the object and the surroundings which is integrated by the diffusion plate 21. The color temperature sensors 22 and 23 have mutually different spectral characteristics and have a high sensitivity with respect to red and blue, respectively. Output signals of the color temperature sensors 22 and 23 are supplied to a color temperature detecting circuit 24 which supplies to a white balance correction control circuit 25 a color temperature detection signal having a level dependent on the detected color temperature. The white balance correction control circuit 25 supplies to the variable gain amplifier means 18 control signals having levels dependent on the color temperature detection signal, that is, control signals having levels which correspond the detected color temperature. The gain of the variable gain amplifier means 18 is controlled responsive to the control signals so that the gain of the primary color signal B in a first line-sequential primary color signal is made large and the gain of the primary color signal R in a second line-sequential primary color signal is made small when the color temperature is low, for example.

The first and second line-sequential primary color signals from the variable gain amplifier means 18 and the components $Y_W$ and $Y_L$ of the luminance signal Y from the YRB separating circuit 17 are supplied to the video signal processing circuit 19 which produces the standard system color video signal from these signals. Accordingly, the white balance is adjusted by controlling the gain of the variable gain amplifier means 18 by the control signals.

FIG. 3 shows an embodiment of the color temperature detecting circuit 24, together with the color temperature sensors 22 and 23. The output detection signals of the sensors 22 and 23 are supplied to a color temperature detector 27, and the output detection signal of the sensor 23 is applied to a non-inverting input terminal of a comparator 29 and to an inverting input terminal of a comparator 30. The comparators 29 and 30 constitute an illuminance discriminating circuit 28 together with an AND circuit 31.

A reference voltage $V_L$ corresponding to an extremely low illuminance is applied to an inverting input terminal of the comparator 29, and a reference voltage $V_H$ corresponding to an extremely high illuminance is applied to a non-inverting input terminal of the comparator 30. Hence, the comparator 29 produces a low-level signal when the illuminance is extremely low and otherwise produces a high-level signal. On the other hand, the comparator 30 produces a low-level signal when the illuminance is extremely high and otherwise produces a high-level signal. The output signals of the comparators 29 and 30 are supplied to the AND circuit 31, and the AND circuit 31 produces an illuminance discrimination signal which has a low level when the illuminance is extremely high or low and has a high level when the illuminance is an appropriate illuminance.

Figure 4:
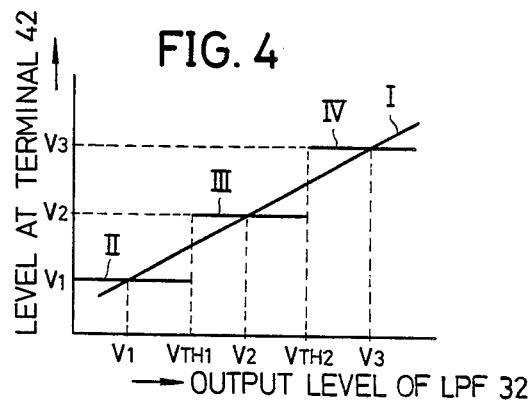
FIG. 4 shows an embodiment of the relationships of the signals at various parts of the block system shown in FIG. 2.

A color temperature detection signal produced from the color temperature detecting circuit 27 is supplied to a lowpass filter 32 wherein an unwanted high frequency component is eliminated, and an output signal of the lowpass filter 32 is applied to a contact a of a switch 33 and to non-inverting input terminals of comparators 35 and 36. The comparators 35 and 36 constitute a color temperature discriminating circuit 34 together with flip-flops 37 and 38. A threshold voltage $V_{TH1}$ of a low color temperature region II and a mid color temperature region III shown in FIG. 4 is applied to an inverting input terminal of the comparator 35, and the comparator 35 produces a color temperature discrimination signal which has a low level when the color temperature detection signal from the lowpass filter 32 is in the low color temperature region II and has a high level when the color temperature detection signal is in the mid color temperature region III or a high color temperature region IV. A threshold voltage $V_{TH2}$ of the mid color temperature region III and the high color temperature region IV shown in FIG. 4 is applied to an inverting input terminal of the comparator 36, and the comparator 36 produces a color temperature discrimination signal which has a low level when the color temperature detection signal from the lowpass filter 32 is in the low color temperature region II or the mid color temperature region III and has a high level when the color temperature detection signal is in the high color temperature region IV. The output color temperature discrimination signals of the comparators 35 and 36 are supplied to respective date input terminals of the flip-flops 37 and 38. The illuminance discrimination signal from the AND circuit 31 of the illuminance discriminating circuit 28 is inverted and applied to clock input terminals of the flip-flops 37 and 38. The flip-flops 37 and 38 latch the color temperature discrimination signals at the time when the illuminance discrimination signal from the AND circuit 31 falls, that is, when the illuminance becomes extremely high or low. Because the color temperature detection signal is delayed in the lowpass filter 32, the color temperature discrimination signal under the appropriate illuminance immediately before the illuminance becomes extremely high or low is latched in the color temperature discriminating circuit 34.

The color temperature discrimination signals from the flip-flops 37 and 38 are applied to control signal terminals of respective switches 40 and 41. An output voltage of the switch 41 is applied to a contact a of the switch 40, and a standard color temperature voltage V1 shown in FIG. 4 in the low color temperature region II is applied to a contact b of the switch 40. The switch 40 selectively passes the signal from the contact a thereof when the control signal has a high level and selectively passes the signal from the contact b thereof when the control signal has a low level. A standard color temperature voltage V3 in the high color temperature region IV is applied to a contact a of the switch 41, and a standard color temperature voltage V2 in the mid color temperature region III is applied to a contact b of the switch 41. The switch 41 selectively passes the signal from the contact a thereof when the control signal has a high level and selectively passes the signal from the contact b thereof when the control signal has a low level. Hence, a standard color temperature signal having the voltage V1 in the low color temperature region II, the voltage V2 in the mid color temperature region III and the voltage V3 in the high color temperature region IV is obtained from the switch 40 and is applied to a contact b of the switch 33.

The illuminance discrimination signal from the AND circuit 31 is applied to a control signal terminal of the switch 33, and the switch 33 selectively passes the signal from the contact a when the illuminance discrimination signal has a high level and selectively passes the signal from the contact b when the illuminance discrimination signal has a low level. Accordingly, the switch 33 supplies to an output terminal 42 the color temperature detection signal from the lowpass filter 32 as indicated by a solid line I in FIG. 4 when the illuminance is the appropriate illuminance. On the other hand, the switch 33 supplies to the output terminal 42 the standard color temperature signal in the color temperature region immediately before the illuminance becomes extremely high or low. The output signal of the switch 33 is supplied to the white balance correction control circuit 25 shown in FIG. 2 via the output terminal 42.

Therefore, under the appropriate illuminance, the white balance adjustment is carried out similarly as in the case of the conventional white balance adjusting apparatus. But under the extremely high or low illuminance, the white balance is adjusted based on a color temperature closest to the color temperature immediately before the illuminance becomes extremely high or low.

In the case of a fluorescent illumination source, the output signal of the color temperature sensor 23 includes flicker. In this case, a lowpass filter may be provided so as to eliminate the flicker and supply an output signal of this lowpass filter to the comparators 29 and 30. It is also possible to design the comparators 29 and 30 to have hysteresis characteristics. In this case, the time constant of the lowpass filter for eliminating the flicker is set smaller than the time constant of the lowpass filter 32.

Due to the provision of the illuminance discriminating circuit 28, the color temperature setting circuit 39 and the switch 33, it is possible to carry out an appropriate white balance adjustment and reduce the possibility of an erroneous white balance adjustment even when the illuminance is extremely high or low. Furthermore, due to the provision of the color temperature discriminating circuit 34, it is possible to carry out the white balance adjustment appropriate for the color temperature immediately before the illuminance becomes extremely high or low.

FIG. 5 shows an embodiment of the white balance correction control circuit 25 shown in FIG. 2. The white balance correction control circuit 25 comprises amplifiers 45 and 46. The color temperature detection signal from the color temperature detecting circuit 24 is supplied to the amplifiers 45 and 46 via a terminal 44, and control signals having levels dependent on the color temperature are supplied to the variable gain amplifier means 18 shown in FIG. 2 via terminals 47 and 48, so as to variably control the gain of the primary color signals R and B.

In the case where the image pickup device 16 is constituted by a solid state image sensor, the image pickup device 16 comprises a light receiving part made up of a plurality of light receiving elements such as photodiodes having a matrix arrangement. Each light transmitting part of the color separation filter 15 is arranged 1:1 in front of each of the light receiving elements.

FIG. 6 shows an example of the arrangement of the light transmitting parts of the color separation filter 15. In FIG. 6, a transmitting part Ma transmits light close to magenta light, a transmitting part G transmits light close to green light, a transmitting part Cy transmits light close to cyan light, and a transmitting part Ye transmits light close to yellow light. The transmitting parts Ma and G in a first row are alternately arranged in the horizontal direction for every predetermined distance equal to one pitch with which the light receiving elements are arranged. The light transmitting parts Cy and Ye in a second row are alternately arranged in the horizontal direction for every predetermined distance equal to one pitch of the light receiving elements. In addition, the light transmitting parts Ma, Cy and G in a first column are arranged sequentially in the vertical direction and this sequence is repeated for every distance equal to three pitches of the light receiving elements. Furthermore, the light transmitting parts G, Ye and Ma in a second column are arranged sequentially in the vertical direction and this sequence is repeated for every distance equal to three pitches of the light receiving elements.

As is well known, the charge in the light receiving element is transferred in a vertical transfer register comprising charge transfer elements such as charge coupled devices (CCDs) and is then supplied to a horizontal transfer register (CCD) from which data are sequentially read out as a video signal. When reading out the data in one line, out of the charges from two rows of light receiving elements which are adjacent to each other in the horizontal scanning direction in each column, the charges from two light receiving elements which are adjacent to each other in the vertical direction are mixed, and the combination of the two columns is changed for the odd and even fields so as to enable the interlaced scanning as may be seen from FIG. 6.

Accordingly, when the read-out is carried out for each field in this manner, the output video signal of the image pickup device 16 is $S_n = Y_n + C_n \cdot \sin \omega t + \ldots$ *in the n-th line, and is* $S_{n+1} = Y_{n+1} + C_{n+1} \cdot \sin \omega t + \ldots$ in the (n+1)th line, where $\omega$ denotes the angular repetition frequency of the light transmitting parts of the color separation filter 15, $Y_n$ and $Y_{n+1}$ denote luminance signals, and $C_n$ and $C_{n+1}$ denote color signals.

According to the conventional white balance adjusting apparatus, the video signal from the image pickup device is supplied to a wide-band lowpass filter within the YRB separating circuit, and the luminance signals $Y_n$ and $Y_{n+1}$ in the baseband are successively filtered and supplied to an output terminal of the YRB separating circuit. At the same time, the modulated waves within the video signal are filtered in a bandpass filter of the YRB separating circuit and is supplied to a synchronous detector of the YRB separating circuit. The synchronous detector successively obtains the color signals $C_n$ and $C_{n+1}$ and supplies these color signals $C_n$ and $C_{n+1}$ to an operation circuit within the YRB separating circuit.

When picking up the image of the object under a reference illumination source L1 with a predetermined color temperature, the luminance signals $Y_n$ and $Y_{n+1}$ satisfy the following equation (1) by appropriately selecting the spectral characteristic of the color separation filter, where Ma, Cy, G and Ye respectively denote signal components of the lights transmitted through the light transmitting parts Ma, Cy, G and Ye.

$$Y_n = Y_{n+1} = Ma + Cy + G + Ye = Y \quad (1)$$

In other words, the luminance signal Y described by the same equation (1) is obtained at the output terminal of the YRB separating circuit for each line.

On the other hand, the demodulated color signals obtained from the synchronous detector satisfy the following equation (2) for the n-th line and the equation (3) for the (n+1)th line by appropriately selecting the spectral characteristics of the light transmitting parts of the color separation filter 15, where R and B respectively denote the red primary color signal R and the blue primary color signal B.

$$C_n = (Ma + Cy) - (G + Ye) = B - Y \quad (2)$$

$$C_{n+1} = (G + Cy) - (Ma + Ye) = Y - R \quad (3)$$

In other words, a line-sequential color difference signal is obtained from the synchronous detector and is supplied to the operation circuit wherein a low frequency component of the luminance signal is added so as to adjust the white balance. This low frequency component of the luminance signal is obtained via a narrowband lowpass filter and a gain adjustor.

Therefore, when the spectral characteristic of the reference illumination source L1 with the predetermined color temperature is flat for all wavelengths ($\lambda$) as shown in FIG. 7(A) and the image of the object is picked up under this reference illumination source L1, the spectral characteristic of the luminance signal Y becomes as shown in FIG. 7(B), the spectral characteristics of the blue and red primary color signals B and R respectively become as shown in FIGS. 7(C) and 7(D), and the spectral characteristics of the color difference signals B−Y and R−Y respectively become as shown in FIGS. 7(E) and 7(F). In FIGS. 7(A) through 7(F) and FIGS. 8(A) through 8(F) which will be described later, the spectral characteristics are shown schematically for the respective illumination sources L1 and L2.

On the other hand, when the spectral characteristic of an illumination source L2 for a different color temperature is as shown in FIG. 8(A), the spectral characteristics of the luminance signal Y, the blue and red primary color signals B and R, and the color difference signals B−Y and R−Y respectively become as indicated by solid lines in FIGS. 8(B) through 8(F).

In order to prevent color from being reproduced on a reproduced picture when the image of an achromatic color object is picked up, the areas surrounded by a reference level indicated by a one-dot chain line and the solid lines above the reference level as indicated by b1 and b3 in FIGS. 7(E) and 8(E) must be equal to areas surrounded by the reference level and the solid lines below the reference level as indicataed by b2 and b4 in FIGS. 7(E) and 8(E), respectively, for the color difference signal B−Y. Similarly, the areas surrounded by the reference level and the solid lines above the reference level as indicated by r1 and r3 in FIGS. 7(F) and 8(F) must be equal to areas surrounded by the reference level and the solid lines below the reference level as indicated by r2 and r4 in FIGS. 7(F) and 8(F), respectively, for the color difference signal R−Y.

As may be seen from FIGS. 7(E) and 7(F), the above conditions b1=b2 and r1=r2 are satisfied under the reference illumination source L1. However, under the illumination source L2, the areas b3 and r3 are larger than the respective areas b4 and r4 as shown in FIGS. 8(E) and 8(F). For this reason, the reproduced picture obtained by picking up the image of the object under the illumination source L2 looks blue-greenish and the white balance is off.

In order to correct the white balance, the YRB separating circuit within the conventional white balance adjusting apparatus of the color television camera subtracts the low frequency component of the luminance signal from the color difference signal B−Y so that the areas above and below the reference level become equal as indicated by phantom lines in FIG. 8(E), and adds the low frequency component of the luminance signal to the color difference signal R−Y so that the areas above and below the reference level become equal as indicated by phantom lines in FIG. 8(F). A line-sequential color difference signal having such color difference signals B−Y and R−Y which have been subjected to either subtraction or addition with the low frequency component of the luminance signal is supplied to the output terminal of the YRB separating circuit.

When the low frequency component of the luminance signal is added or subtracted, it is possible to make the areas above and below the reference level equal for both the color difference signals B−Y and R−Y, but the conventional white balance adjusting apparatus suffers a problem in that the color reproducibility (or color reproduction) is poor because coefficients of the color difference signals which are adjusted as indicated by the phantom lines in FIGS. 8(E) and 8(F) are no longer the same as the coefficients of the color difference signals shown in FIGS. 7(E) and 7(F).

Figure 9:
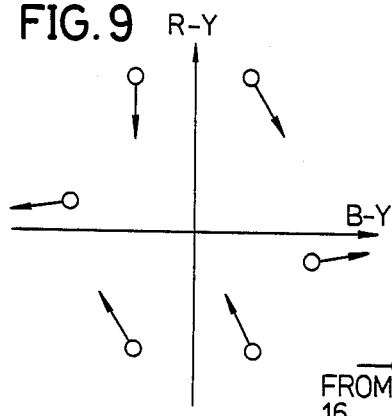

In other words, when the image of a color bar is picked up by the color television camera comprising the conventional white balance adjusting apparatus under the reference illumination source L1 and the video signal is observed on a vector analyzer, each of color signal components located at positions indicated by circles in FIG. 9 move in the directions of arrows when the image of the same color bar is picked up under the illumination source L2 and the white balance adjustment described above is carried out, and it is impossible to correctly reproduce the colors. This is because the conventional white balance adjusting apparatus adjusts the white balance based on a mixed signal of the three primary color signals. That is, the green primary color signal G within the luminance signal Y exists in a proportion greater than those of the red and blue primary color signals R and B within the luminance signal Y, and the color temperature is overcorrected for the green primary color signal G while the color temperature is undercorrected for the red and blue primary color signals R and B.

Figure 10:
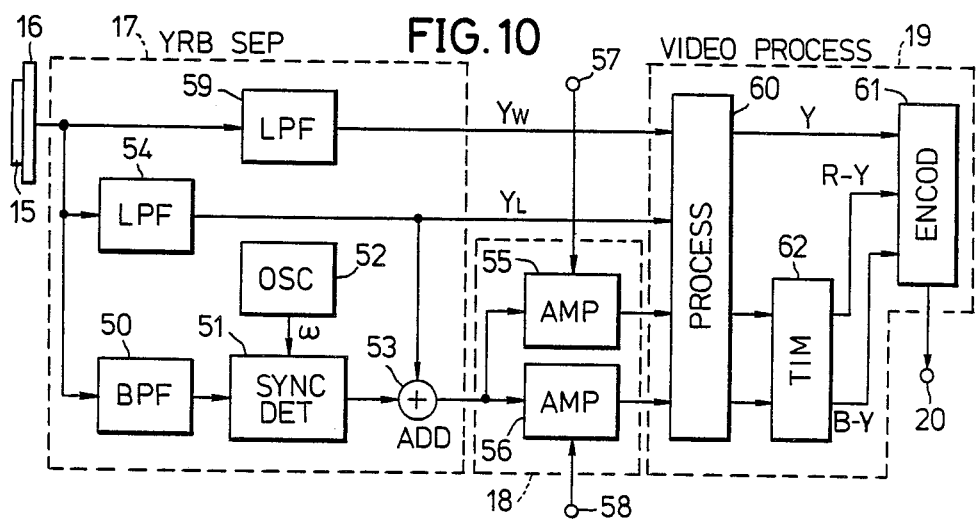
FIG. 10 is a system block diagram showing an embodiment of a YRB separating circuit system in the block system shown in FIG. 2.

Description will now be given with respect to a YRB separating circuit system in which the problems described heretofore are eliminated. FIG. 10 shows an embodiment of the YRB separating circuit system shown in FIG. 2. In FIG. 10, those parts which are the same as those corresponding parts in FIG. 2 are designated by the same reference numerals, and description thereof will be omitted. In FIG. 10, modulated waves $C_n \cdot \sin \omega t$ or $C_{n+1} \cdot \sin \omega t$ from a bandpass filter 50 are supplied to a synchronous detector 51 and a synchromous detection is carried out responsive to a demodulating carrier from an oscillator 52 having an angular carrier frequency $\omega$. Hence, the color difference signal B−Y described by the equation (2) is obtained from the synchronous detector 51 in the n−th line, and the color difference signal R−Y which is a phase inverted signal of the color difference signal Y−R described by the equation (3) is obtained from the synchronous detector 51 in the (n+1)th line.

An adder 53 adds to the line-sequential color difference signal from the synchronous detector 51 a predetermined quantity of the low frequency component $Y_L$ of the luminance signal. This low frequency component $Y_L$ has a frequency band identical to those of the color difference signals B−Y and R−Y and is obtained from a narrow-bank lowpass filter 54. The luminance signal component in the color difference signals B−Y and R−Y and the low frequency component $Y_L$ are in the same frequency band and the spectral characteristics thereof are the same. For this reason, the balance between the luminance signal Y and the low frequency component $Y_L$ does not change regardless of the spectral characteristic of the illumination source, and an output signal of the adder 53 is either one of the primary color signals described by the following equations (4) and (5) which are virtually unaffected by the luminance signal component within the color difference signals nor the low frequency component $Y_L$ of the luminance signal.

$$(B-Y)+Y_L=B \tag{4}$$

$$(R-Y)+Y_L=R \tag{5}$$

The line-sequential primary color signal from the adder 53 alternately comprises in time-sequence the blue primary color signal B and the red primary color signal R for every one horizontal scanning period. This line-sequential primary color signal is supplied to variable gain amplifiers 55 and 56 constituting the variable gain amplifier means 18. The gains of the variable gain amplifiers 55 and 56 are variably controlled responsive to respective control signals (voltages) obtained from the white balance correction control circuit 25 via terminals 57 and 58. The control voltages are set by taking the level of the low frequency component $Y_L$ as a reference level, so that the level of the red primary color signal R in the variable gain amplifier 55 and the level of the blue primary color signal B in the variable gain amplifier 56 are made equal to the reference level when the image of a white object is picked up. During a normal image pickup, the control voltages are maintained to these voltages which are set during the white balance adjustment.

A processing circuit 60 carries out various signal processings such as gamma correction on the four kinds of signals supplied thereto. A matrix circuit within the processing circuit 60 produces two kinds of line-sequential color difference signals from the output low frequency component $Y_L$ of the lowpass filter 54 and the two line-sequential primary color signals obtained from the variable gain amplifiers 55 and 56, and a luminance signal Y in the wide-bank from an output wide-band component $Y_W$ of the luminance signal of a wide-band lowpass filter 59. The luminance signal Y from The processing circuit 60 is supplied to an encoder 61.

The two kinds of line-sequential color difference signals are supplied to a timing circuit 62 which discards the color difference signal B−Y within the line-sequential color difference signal derived from the output of the variable gain amplifier 55 so as to produce the color difference signal R−Y and discards the color difference signal R−Y within the line-sequential color difference signal derived from the output of the variable gain amplifier 56 so as to produce the color difference signal B−Y. The color difference signals R−Y and B−Y are simultaneously produced from the timing circuit 62 and are supplied to the encoder 61.

The encoder 61 produces a carrier chrominance signal by quadrature modulation of predetermined chrominance subcarriers by the color difference signals R−Y and B−Y from the timing circuit 62, and produces a standard system color video signal by band-share-multiplexing the carrier chrominance signal and the luminance signal Y from the processing circuit 60. The standard system color video signal is supplied to the output terminal 20.

According to the present embodiment, the image of the white object is picked up when ajusting the white balance, and the gains of the variable gain amplifiers 55 and 56 are variably controlled independently so that the level of the red primary color signal R within the output line-sequential primary color signal of the variable gain amplifier 55 and the level of the blue primary color signal B within the output line-sequential primary color signal of the variable gain amplifier 56 become equal to the level of the low frequency component $Y_L$. That is, the gains of the variable gain amplifiers 55 and 56 are controlled so that the levels of the color difference signals R−Y and B−Y produced from the timing circuit 62 becomes zero. Because the levels of the primary color signals R and B are adjusted according to the present embodiment and not the levels of the color difference signals, the color reproducibility will not become poor.

Figure 11:
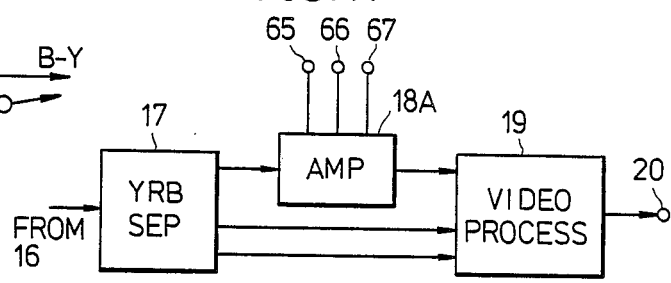
FIG. 11 is a system block diagram showing an essential part of a second embodiment of the white balance adjusting apparatus according to the present invention.

FIG. 11 shows an essential part of a second embodiment of the white balance adjusting apparatus according to the present invention. In FIG. 2, those parts which are the same as those corresponding parts in FIG. 2 are either omitted or designated by the same reference numerals, and descrption thereof will be omitted. In the present embodiment, variable gain amplifier means 18A is supplied with a line descrimination signal which is obtained via a terminal 67 and has a polarity thereof inverted for every one horizontal scanning period, in addition to the output control voltages of the white balance correction control circuit 25 obtained via terminals 65 and 66. When adjusting the white balance by picking up the image of the white object, the gain of the variable gain amplifier means 18A is alternately controlled responsive to one of the two control voltages from the terminals 65 and 66 for every one horizontal scanning period, so that the levels of the primary color signals in the output line-sequential primary color signal of the variable gain amplifier means 18A become equal to the level of the low frequency component $Y_L$. Accordingly, a line-sequential primary color signal having the levels of the primary color signals therein appropriately adjusted is supplied to the video signal processing circuit 19.

Figure 12:
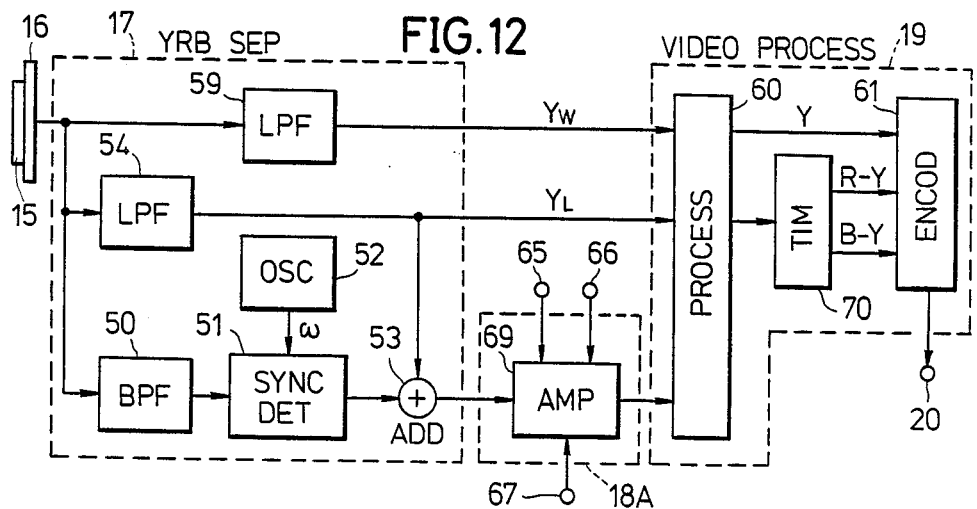
FIG. 12 is a system block diagram showing an embodiment of a YRB separating circuit system in the block system shown in FIG. 11.

Next, description will be given with respect to an embodiment of the YRB separating circuit system shown in FIG. 11 by referring to FIG. 12. In FIG. 12, those parts which are the same as those corresponding parts in FIGS. 10 and 11 are designated by the same reference numerals, and description thereof will be omitted. In FIG. 12, the variable gain amplifier means 18A is constituted by a single variable gain amplifier 69. The gain of the variable gain amplifier 69 is alternately controlled by the control voltages from the terminals 65 and 66 for every one horizontal scanning period responsive to the line descrimination signal from the terminal 67, so as to independently control the levels of the primary color signals R and B within the output line-sequential primary color signal of the adder 53.

In other words, when adjusting the white balance by picking up the image of the white object, the control voltage which is used to control the gain of the variable gain amplifier 69 is switched between the control voltages from the terminals 65 and 66 for every one horizontal scanning period, so that levels of the primary color signals R and B within the line-sequential primary color signal become equal to the level of the low frequency component $Y_L$.

As a result, a line-sequential primary color signal having the levels of the primary color signals therein appropriately adjusted is supplied to the processing circuit 60 within the video signal processing circuit 19. The processing circuit 60 produces a line-sequential color difference signal in which the color difference signals R−Y and B−Y are alternately arranged in time-sequence for every one horizontal scanning period by subjecting the low frequency component $Y_L$ and the line-sequential primary color signal to predetermined signal processings, and the line-sequential color difference signal is supplied to a known timing circuit 70. The timing circuit 70 simultaneously produces the color difference signals R−Y and B−Y, and these color difference signals R−Y and B−Y are supplied to the encoder 61 together with the luminance signal Y from the processing circuit 60.

The present embodiment is characterized by the timing circuit 70 which is provided on the output side of the processing circuit 60, and the signal processing in the timing circuit 70 is carried out with respect to the color difference signals. Thus, unlike in the embodiments described later in which the signal processing in the timing circuit is carried out with respect to the primary color signals, the present embodiment and the embodiment described before are more advantageous in that the color error in the vertical direction is smaller when picking up the image of the achromatic color object.

The adder 53 may add to the line-sequential primary color signal a predetermined quantity of the wide-band component $Y_W$. But in such a case, it becomes necessary to pass the output signal of the adder 53 through a lowpass filter having a characteristic identical to that of the narrow-band lowpass filter 54, and the added signal component is as a result the low frequency component $Y_L$.

FIG. 13 shows an essential part of a third embodiment of the white balance adjusting apparatus according to the present invention. In FIG. 13, those parts which are the same as those corresponding parts in FIG. 2 are either omitted or designated by the same reference numerals, and description thereof will be omitted. In the present embodiment, variable gain amplifier means 18B is simultaneously supplied with the primary color signals R and B from a YRB separating circuit 18B, and the gain of the variable gain amplifier means 18B is controlled responsive to control voltages from the white balance correction control circuit 25 obtained via the terminals 65 and 66. The video signal processing circuit 19 is supplied with the primary color signals R and B from the variable gain amplifier means 18B and the luminance signal components $Y_W$ and $Y_L$ from the YRB separating circuit 17B.

FIG. 14 shows a first embodiment of the YRB separating circuit system shown in FIG. 13. In FIG. 14, those parts which are the same as those corresponding parts in FIGS. 10 and 13 are designated by the same reference numerals, and description thereof will be omitted. The line-sequential primary color signal from the adder 53 alternately comprising the primary color signals R and B for every one horizontal scanning period is supplied to a known timing circuit 72 which simultaneously produces the primary color signals R and B. Hence, the primary color signals R and B simultaneously obtained from the timing circuit 72 are supplied to respective variable gain amplifiers 73 and 74 which constitute the variable gain amplifier means 18B.

The gains of the variable gain amplifiers 73 and 74 are variably controlled responsive to the respective control voltages from the terminals 73 and 74. The control voltages are set so that the levels of the primary color signals R and B become equal to the reference level which is the level of the low frequency component $Y_L$ of the luminance signal when picking up the image of the white object. The control voltages thus set at the time of the white balance adjustment are maintained during the normal image pickup.

The processing circuit 60 subjects the four kinds of signals supplied thereto to predetermined signal processings such as gamma correction. The processing circuit 60 produces the two kinds of color difference signals R−Y and B−Y from the low frequency component $Y_L$ obtained from the lowpass filter 54 and the primary color signals R and B obtained from the variable gain amplifiers 73 and 74, and also produces the luminance signal Y from the wide-band component $Y_W$ obtained from the lowpass filter 59. The color difference signals R−Y and B−Y and the luminance signal Y are supplied to the encoder 61.

The encoder 60 produces a carrier chrominance signal by a quadrature modulation of predetermined chrominance subcarriers by the color difference signals R−Y and B−Y, and produces the standard system color video signal by band-share-multiplexing the carrier chrominance signal and the luminance signal Y. This standard system color video signal is supplied to the output terminal 20.

According to the present embodiment, the image of the white object is picked up when adjusting the white balance, and the gains of the variable gain amplifiers 73 and 74 are variably controlled independently so that the levels of the output primary color signals R and B of the variable gain amplifiers 73 and 74 become equal to the level of the low frequency component $Y_L$. That is, the gains of the variable gain amplifiers 73 and 74 are controlled so that the levels of the color difference signals R−Y and B−Y produced from the processing circuit 60 becomes zero. Because the levels of the primary color signals R and B are adjusted according to the present embodiment and not the levels of the color difference signals, the color reproducibility will not become poor.

Next, description will be given with respect to a second embodiment of the YRB separating circuit system shown in FIG. 13 by referring to FIG. 15. In FIG. 15, those parts which are the same as those corresponding parts in FIG. 14 are designated by the same reference numerals, and description thereof will be omitted. In FIG. 15, the low frequency component $Y_L$ from the lowpass filter 54 is supplied to a multiplier 76 and is multiplied with a carrier $\omega_a$ from an oscillator 77. This carrier $\omega_a$ has an angular frequeny identical to that of the demodulating carrier $\omega$ supplied to the synchronous detector 51 and has a polarity which is inverted for every one horizontal scanning period.

Hence, a second modulated wave which is as if it were obtained by amplitude-modulating a carrier by the low frequency component $Y_L$ is obtained from the multiplier 76 and is supplied to the adder 53. The adder 53 adds the second modulated wave and the first modulated wave such as $C_n \cdot \sin \omega t$ and $C_{n+1} \cdot \sin \omega t$ from the bandpass filter 50. The synchronous detector 51 detects the output signal of the adder 53 and alternately produces the primary color signal B described by the equation (4) and the primary color signal R described by the equation (5) for every one horizontal scanning period.

The output line-sequential primary color signal from the synchronous detector 51 is supplied to the timing circuit 72, and the operations thereafter are the same as those of the embodiment of the YRB separating circuit system described in conjunction with FIG. 14. It is possible to use an envelope detector instead of the synchronous detector 51.

As described heretofore, the white balance is adjusted by adjusting the levels of the two primary color signals to be approximately the same as (or identical to) the level of the low frequency component $Y_L$ of the luminance signal when picking up the image of the white object. For this reason, it is possible to carry out an optimum white balance adjustment so that the color reproducibility does not change depending on the color temperature of the illumination source, and the color reproducibility is improved compared to the conventional white balance adjusting apparatus. In addition, since it is possible to carry out appropriate gamma correction and the like on the primary color signals, the color reproducibility is superior compared to that obtainable in the conventional white balance adjusting apparatus.

Further, the present invention is not limited to these embodiments, but various variations and modifications may be made without departing from the scope of the present invention.

What is claimed is:

1. A white balance adjusting apparatus comprising:
   a plurality of sensors having mutually different spectral characteristics for producing color temperature detection signals dependent on a color temperature of an environment;
   color temperature detecting means comprising an illuminance discriminating circuit for discriminating from an output color temperature signal of at least one of said plurality of sensors whether or not an illuminance of said environment is within a predetermined range appropriate for a white balance adjustment and for producing an illuminance discrimination signal, a color temperature discriminating circuit for producing a predetermined color temperature detection signal from the output color temperature detection signals of said plurality of sensors, for producing a color temperature discrimination signal by discriminating which one of a plurality of color temperature regions the color temperature of said environment falls in and for outputting responsive to said illuminance discrimination signal and color temperature discrimination signal produced at a time immediately before the illuminance of said environment falls outside said predetermined range, a standard color temperature setting circuit for setting and outputting one of a plurality of standard color temperature signals for each of said plurality of color temperature regions, said one of a plurality of standard color temperature signals having a level dependent on the output color temperature discrimination signal of said color temperature discriminating circuit, and a switching circuit responsive to said illuminance discrimination signal for selectively passing said predetermined color temperature detection signal when the illuminance of said environment is within said predetermined range and for selectively passing the output standard color temperature signal of said standard color temperature setting circuit when the illuminance of said environment falls outside said predetermined range, an output signal of said switching circuit being outputted as an output signal of said color temperature detecting means;

white balance correction control means responsive to the output signal of said color temperature detecting means for producing first and second control signals;

an image pickup device for picking up an image of an object and for producing a video signal comprising a luminance signal in a baseband and modulated waves obtained by modulating carriers by color difference signals;

separating means for separating the output video signal of said image pickup device into a luminance signal and a line-sequential primary color signal;

variable gain amplifier means for amplifying said line-sequential primary color signal with first and second gains respectively controlled responsive to said first and second control signals so as to produce first and second line-sequential primary color signals; and video signal processing means for producing a standard system color video signal from said first and second line-sequential primary color signals and said luminance signal from said separating means, said first control signal variably controlling the first and second gains of said variable gain amplifier means so that a level of a first primary color signal within said first line-sequential primary color signal and a level of a second primary color signal are approximately equal to a level of a low frequency component of the luminance signal when said image pickup device picks up an image of a white object.

2. A white balance adjusting apparatus as claimed in claim 1 in which said separating means comprises first and second filter circuits for independently separating the low frequency component of the luminance signal within said video signal and said modulated waves within said video signal, a detector of producing a line-sequential color difference signal by detecting said modulated waves from said second filter circuit, and an adder for adding a predetermined quantity of said low frequency component of the luminance signal obtained from said first filter circuit to said line-sequential color difference signal so as to produce said line-sequential primary color signal.

3. A white balance adjusting apparatus as claimed in claim 2 in which said variable gain amplifier means comprises a first variable gain amplifier for producing said first line-sequential primary color signal by amplifying the line-sequential primary color signal from said separating means with said first gain responsive to said first control signal, and a second variable gain amplifier for producing said second line-sequential primary color signal by amplifying the line-sequential primary color signal from said separating means with said second gain responsive to said second control signal.

4. A white balance adjusting apparatus as claimed in claim 3 in which said video signal processing means comprises a processing circuit for producing first and second line-sequential color difference signals from said first and second line-sequential primary color signals and said luminance signal, and a timing circuit for simultaneously outputting first and second color difference signals by discarding a second color difference signal component within said first line-sequential color difference signal and discarding a first color difference signal component within said second line-sequential color difference signal.

5. A white balance adjusting apparatus as claimed in claim 4 in which said first and second primary color signals respectively are red and blue primary color signals, and said first and second color difference signals respectively are color difference signals $R-Y$ and $B-Y$.

6. A white balance adjusting apparatus comprising:
a plurality of sensors having mutually different spectral characteristics for producing color temperature detection signals dependent on a color temperature of an environment;
color temperature detecting means comprising an illuminance discriminating circuit for discriminating from an output color temperature detection signal of at least one of said plurality of sensors whether or not an illuminace of said environment is within a predetermined range appropriate for a white balance adjustment and for producing an illuminance discrimination signal, a color temperature discriminating circuit for producing a predetermined color temperature detection signal from the output color temperature detection signals of said plurality of sensors, for producing a color temperature discrimination signal by discriminating which one of a plurality of color temperature regions the color temperature of said environment falls in and for outputting responsive to said illuminance discrimination signal the color temperature discrimination signal produced at a time immediately before the illuminance of said environment falls outside said predetermined range, a standard color temperature setting circuit for setting and outputting one of a plurality of standard color temperature signals for each of said plurality of color temperature signals having a level dependent on the output color temperature discrimination signal of said color temperature discriminating circuit, and a switching circuit responsive to said illuminance discrimination signal for selectively passing said predetermined color temperature detection signal when the illuminance of said environment is within said predetermined range and for selectively passing the output standard color temperature signal of said standard color temperature setting circuit when the illuminance of said environment falls outside said predetermined range, an output signal of said switching circuit being outputted as an output signal of said color temperature detecting means;

white balance correction control means responsive to the output signal of said color temperature detecting means for producing first and second control signals;

an image pickup device for picking up an image of an object and for producing a video signal comprising a luminance signal in a baseband and modulated waves obtained by modulating carriers by color difference signals;

separating means for separating the output video signal of said image pickup device into a luminance signal and a line-sequential primary color signal;

variable gain amplifier means for alternately amplifying said line-sequential primary color signal with first and second gains respectively controlled responsive to said first and second control signals; and video signal processing means for producing a standard system color video signal from an output line-sequential primary color signal of said variable gain amplifier means and said luminance signal from said separating means, said first control signal variably controlling the first and second gains of said variable gain amplifier means so that levels of a first primary color signal and a second primary color signal within the output line-sequential primary color signal of said variable gain amplifier means are approximately equal to a level of a low frequency component of the luminance signal when said image pickup device picks up an image of a white object.

7. A white balance adjusting apparatus as claimed in claim 6 in which said separating means comprises first and second filter circuits for independently separating the low frequency component of the luminance signal within said video signal and said modulated waves within said video signal, a detector for producing a line-sequential color difference signal by detecting said modulated waves from said second filter circuit, and an adder for adding a predetermined quantity of said low frequency component of the luminance signal obtained from said first filter circuit to said line-sequential color difference signal so as to produce said line-sequential primary color signal.

8. A white balance adjusting apparatus as claimed in claim 7 in which said variable gain amplifier means is further supplied with a line discrimination signal which inverts polarity thereof for every one horizontal scanning period, said variable gain amplifier means comprising a single variable gain amplifier for amplifying the first primary color signal within the line-sequential primary color signal from said separating means with said first gain responsive to said first control signal and said line discrimination signal and for amplifying the second primary color signal within the line-sequential primary color signal from said separating means with said second gain responsive to said second control signal and said line discrimination signal.

9. A white balance adjusting apparatus as claimed in claim 8 in which said first and second primary color signals respectively are red and blue primary color signals.

10. A white balance adjusting apparatus comprising:

a plurality of sensors having mutually different spectral characteristics for producing color temperature detection signals dependent on a color temperature of an environment;

color temperature detecting means comprising an illuminance discriminating circuit for discriminating from an output color temperature detection signal of at least one of said plurality of sensors whether or not an illuminance of said environment is within a predetermined range appropriate for a white balance adjustment and for producing an illuminance discrimination signal, a color temperature discriminating circuit for producing a predetermined color temperature detection signal from the output color temperature detection signals of said plurality of sensors, for producing a color temperature discrimination signal by discriminating which one of a plurality of color temperature regions the color temperature of said environment falls in and for outputting responsive to said illuminance discrimination signal the color temperature discrimination signal produced at a time immediately before the illuminance of said environment falls outside said predetermined range, a standard color temperature setting circuit for setting and outputting one of a plurality of standard color temperature signals for each of said plurality of color temperature regions, said one of a plurality of standard color temperature signals having a level dependent on the output color temperature discrimination signal of said color temperature discriminating circuit, and a switching circuit responsive to said illuminance discrimination signal for selectively passing said predetermined color temperature detection signal when the illuminance of said environment is within said predetermined range and for selectively passing the output standard color temperature signal of said standard color temperature setting circuit when the illuminance of said environment falls outside said predetermined range, an output signal of said switching circuit being outputted as an output signal of said color temperature detecting means;

white balance correction control means responsive to the output signal of said color temperature detecting means for producing first and second control signals;

an image pickup device for picking up an image of an object and for producing a video signal comprising an luminance signal in a baseband and modulated waves obtained by modulating carriers by color difference signals;

separating means for separating the output video signal of said image pickup device into a luminance signal and first and second primary color signals;

variable gain amplifier means for respectively amplifying said first and second primary color signals with first and second gains respectively controlled responsive to said first and second control signals; and video signal processing means for producing a standard system color video signal from the first and second primary color signals obtained from said variable gain amplifier means and said luminance signal from said separating means, said first control signal variably controlling the first and second gains of said variable gain amplifier means so that levels of said first and second primary color signals are approximately equal to a level of a low frequency component of the luminance signal when said image pickup device picks up an image of a white object.

11. A white balance adjusting apparatus as claimed in claim 10 in which said separating means comprises first and second filter circuits for independently separating the low frequency component of the luminance signal within said video signal and said modulated waves within said video signal, a detector for producing a line-sequential color difference signal by detecting said modulated waves from said second filter circuit, an adder for adding a predetermined quantity of said low frequency component of the luminance signal obtained from said first filter circuit to said line-sequential color difference signal so as to produce a line-sequential primary color signal, and a timing circuit for simultaneously producing the first and second primary color signals from said line-sequential primary color signal.

12. A white balance adjusting apparatus as claimed in claim 11 in which said variable gain amplifier means comprises a first variable gain amplifier for amplifying the first primary color signal from said separating means with said first gain responsive to said first control signal, and a second variable gain amplifier for amplifying the second primary color signal from said separating means with said second gain responsive to said second control signal.

13. A white balance adjusting apparatus as claimed in claim 12 in which said first and second primary color signals respectively are red and blue primary color signals.

14. A white balance adjusting apparatus as claimed in claim 10 in which said separating means comprises first and second filter circuits for independently separating the low frequency component of the luminance signal within said video signal and said modulated waves within said video signal, a multiplier for producing a signal which is obtained by modulating a carrier by the low frequency component of the luminance signal from said first filter circuit, an adder for adding a predetermined quantity of the output signal of said multiplier to said modulated waves from said second filter circuit, a detector for producing a line-sequential primary color signal by detecting an output signal of said adder, and a timing circuit supplied with the output line-sequential primary color signal of said adder for simultaneously producing the first and second primary color signals.

15. A white balance adjusting apparatus as claimed in claim 14 in which said variable gain amplifier means comprises a first variable gain amplifier for amplifying the first primary color signal from said separating means with said first gain responsive to said first control signal, and a second variable gain amplifier for amplifying the second primary color signal from said separating means with said second gain responsive to said second control signal.

16. A white balance adjusting apparatus as claimed in claim 15 in which said first and second primary color signals respectively are red and blue primary color signals.

* * * * *

UNITED STATES PATENT AND TRADEMARK OFFICE
CERTIFICATE OF CORRECTION

PATENT NO. : 4,739,392

DATED : April 19, 1988

INVENTOR(S) : KAZUHIKO UEDA ET AL

It is certified that error appears in the above-identified patent and that said Letters Patent is hereby corrected as shown below:

| | |
|---|---|
| Column 14, line 12, | delete "frequeny" and substitute therefor ---frequency--- |
| Column 16, line 45 | delete "illuminace" and substitute therefor ---illuminance--- |
| Column 16, line 64 | after "temperature" insert ---regions, said one of a plurality of standard color temperature--- |

Signed and Sealed this

Thirteenth Day of June, 1989

*Attest:*

DONALD J. QUIGG

*Attesting Officer*      *Commissioner of Patents and Trademarks*